(12) United States Patent
Boss et al.

(10) Patent No.: US 10,613,907 B2
(45) Date of Patent: *Apr. 7, 2020

(54) RESOURCE SUBSTITUTION AND REALLOCATION IN A VIRTUAL COMPUTING ENVIRONMENT

(71) Applicant: International Business Machines Corporation, Armonk, NY (US)

(72) Inventors: Gregory J. Boss, Saginaw, MI (US); Seyyed Vahid Hashemian, Redwood City, CA (US); Ton A. Ngo, Gilroy, CA (US); Thomas K. Truong, Pleasanton, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/194,623

(22) Filed: Nov. 19, 2018

(65) Prior Publication Data

US 2019/0087235 A1 Mar. 21, 2019

Related U.S. Application Data

(63) Continuation of application No. 15/788,915, filed on Oct. 20, 2017, now Pat. No. 10,255,112, which is a
(Continued)

(51) Int. Cl.
*G06F 9/455* (2018.01)
*G06F 9/50* (2006.01)
*H04L 12/911* (2013.01)

(52) U.S. Cl.
CPC ........ *G06F 9/5077* (2013.01); *G06F 9/45558* (2013.01); *G06F 9/5011* (2013.01);
(Continued)

(58) Field of Classification Search
CPC .. G06F 9/5077; G06F 9/45558; G06F 9/5011; G06F 2009/45595;
(Continued)

(56) References Cited

U.S. PATENT DOCUMENTS 5,668,995 A 9/1997 Bhat
6,470,464 B2 10/2002 Bertram et al.
(Continued)

FOREIGN PATENT DOCUMENTS

WO 2008024564 B1 6/2008

OTHER PUBLICATIONS

Ali, Z., "Social Networking for Sharing Cloud Resources," 2010-NUST-MS-PhD IT-39, A thesis submitted in partial fulfillment of the requirements for the degree of Masters of Science in Information Technology (MS IT) In School of Electrical Engineering and Computer Science, National University of Sciences and Technology (NUST), Islamabad, Pakistan (Jun. 2013), 88 pages.
(Continued)

*Primary Examiner* — Anna C Deng
(74) *Attorney, Agent, or Firm* — Nicholas D. Bowman

(57) ABSTRACT

A host system reallocates resources in a virtual computing environment by first receiving a request to reallocate a first quantity of a first resource type. Next, potential trade-off groups are evaluated and a trade-off group is selected based on the evaluation. The selected trade-off group includes a set of applications running in the virtual computing environment that can use one or more alternate resource types as a substitute for the first quantity of the first resource type. After the selection, the host system reallocates the first quantity of the first resource type from the trade-off group. This reallocation may be made from the trade-off group to either a first application running in the virtual computing environment or the host system itself. If the reallocation is
(Continued)

to the host system, then the total quantity of the first resource type allocated to applications running in the virtual computing environment is thereby reduced.

12 Claims, 9 Drawing Sheets

Related U.S. Application Data continuation of application No. 14/994,353, filed on Jan. 13, 2016, now Pat. No. 9,898,345, which is a continuation of application No. 14/504,590, filed on Oct. 2, 2014, now Pat. No. 9,280,392.

(52) U.S. Cl.
CPC .. *H04L 47/745* (2013.01); *G06F 2009/45591* (2013.01); *G06F 2009/45595* (2013.01); *G06F 2209/504* (2013.01); *G06F 2209/509* (2013.01)

(58) Field of Classification Search
CPC ..... G06F 2009/45591; G06F 2209/504; G06F 2209/509; H04L 47/745
USPC .......................................................... 718/1
See application file for complete search history.

(56) References Cited

U.S. PATENT DOCUMENTS

| | | | | |
|---|---|---|---|---|
| 7,236,915 | B2* | 6/2007 | Algieri | G06F 17/50 702/182 |
| 7,420,992 | B1* | 9/2008 | Fang | H04L 12/4633 370/477 |
| 8,296,762 | B2 | 10/2012 | Knauerhase et al. | |
| 8,352,608 | B1 | 1/2013 | Keagy et al. | |
| 8,429,276 | B1* | 4/2013 | Kumar | G06F 9/45533 709/226 |
| 8,606,667 | B2* | 12/2013 | Ferris | G06F 9/505 705/30 |
| 8,730,994 | B2 | 5/2014 | Kannan et al. | |
| 8,799,431 | B2* | 8/2014 | Pabari | G06F 9/5072 709/220 |
| 8,903,983 | B2 | 12/2014 | Bakman et al. | |
| 9,280,392 | B1* | 3/2016 | Boss | G06F 9/5011 |
| 9,465,630 | B1 | 10/2016 | Muniz et al. | |
| 9,495,222 | B1 | 11/2016 | Jackson | |
| 9,626,225 | B2 | 4/2017 | Boss et al. | |
| 9,898,345 | B2 | 2/2018 | Boss et al. | |
| 9,898,346 | B2 | 2/2018 | Boss et al. | |
| 2002/0178260 | A1 | 11/2002 | Chang | |
| 2009/0031307 | A1* | 1/2009 | Chodroff | G06F 9/5077 718/100 |
| 2010/0306163 | A1 | 12/2010 | Beaty et al. | |
| 2011/0213686 | A1* | 9/2011 | Ferris | G06F 9/505 705/34 |
| 2012/0011510 | A1* | 1/2012 | Yamakabe | G06F 9/5072 718/1 |
| 2012/0166624 | A1* | 6/2012 | Suit | G06F 9/5077 709/224 |
| 2012/0174097 | A1 | 7/2012 | Levin | |
| 2013/0042003 | A1* | 2/2013 | Franco | H04L 67/1097 709/226 |
| 2015/0212857 | A1* | 7/2015 | Beveridge | G06F 9/5011 718/1 |
| 2016/0099884 | A1 | 4/2016 | Boss et al. | |
| 2016/0124777 | A1 | 5/2016 | Boss et al. | |
| 2017/0123858 | A1 | 5/2017 | Boss et al. | |
| 2018/0039525 | A1 | 2/2018 | Boss et al. | |

OTHER PUBLICATIONS

Beloglazov, A. et al, "Energy Efficient Resource Management in Virtualized Cloud Data Centers," 2010 10th IEEE/ACM International Conference on Cluster, Cloud and Grid Computing (CCGrid), 6 pages, 978-0-7695-4039-9/10 © 2010 IEEE, DOI 10.1109/CCGRID. 2010.46.

He, S. et al., "Real Time Elastic Cloud Management for Limited Resources," 2011 IEEE 4th International Conference on Cloud Computing, 8 pages, © 2011 IEEE, DOI 10.1109/CLOUD.2011.47.

Verma, A. et al., "The Cost of Reconfiguration in a Cloud," Proceedings of the 11th International Middleware Conference Industrial track, Middleware'10 Companion Bangalore, India, 6 pages, Copyright 2010 ACM.

Younge, A. et al., "Efficient Resource Management for Cloud Computing Environments," 2010 International Green Computing Conference, 8 pages, © 2010 IEEE, 978-1-4244-7614-5/10.

Csáji, B.C., "Adaptive Resource Control," Machine Learning Approaches to Resource Allocation in Uncertain and Changing Environments, Ph.D. Thesis, Faculty of Informatics (IK), Eötvös Loránd University (ELTE), Doctoral School of Computer Science, Foundations and Methods in Informatics Ph.D. Program, Chairman: Prof. János Demetrovics, Member of HAS Computer and Automation Research Institute (SZTAKI), Hungarian Academy of Sciences (HAS, MTA) Budapest, Hungary, 2008, 106 pages.

Mell, P. et al., "The NIST Definition of Cloud Computing," Recommendations of the National Institute of Standards and Technology, U.S. Department of Commerce, Special Publication 800-145, 7 pgs., Sep. 2011.

IBM, List of IBM Patents or Patent Applications Treated as Related, Aug. 31, 2018, 2 pages.

* cited by examiner

| | CPU Shortage | Memory Shortage | Network Shortage | Storage Shortage | GPU Shortage |
|---|---|---|---|---|---|
| CPU Available | N/A | | increase compression of network data | increase compression of stored data | offload GPU processing to CPU |
| Memory Available | increase cache size for instructions/data | N/A | | increase cache size for data | |
| Network Available | reduce compression of network data | | N/A | increase cache size (to reduce page swapping) | |
| Storage Available | reduce compression of stored data | increase swap file size | | N/A | |
| GPU Available | offload CPU calculations to GPU | | | | N/A |

RESOURCE SUBSTITUTION AND REALLOCATION IN A VIRTUAL COMPUTING ENVIRONMENT

BACKGROUND

The present disclosure relates to virtual computing environments, and more specifically, to managing resource reallocation through resource substitution in applications running in virtual computing environments.

The use of virtual computing environments has become increasingly popular in recent years in many areas of business and technology. In some situations, these virtual computing environments include applications running on virtual machines that are each allocated resources from a shared pool of resources. As used herein, such an application may refer to any program or set of programs (e.g., all of the programs running on a particular virtual machine). Within virtual computing environments, many different types of resources may be subject to allocation and the allocation of resources may not be equal among virtual machines (or their respective applications), even within a single virtual computing environment. In some situations, this inequality may be the result of different applications having different resource requirements (both in terms of resource types and resource quantities) and the result of the different applications being used for different purposes.

SUMMARY

According to embodiments of the present disclosure, aspects of the disclosure may include a method, a system, and a computer program product for reallocating resources in a virtual computing environment. In some embodiments, a request to reallocate a first quantity of a first resource type in the virtual computing environment may be received. A trade-off group may then be selected. The trade-off group may include a set of applications running in the virtual computing environment. The trade-off group may have at the first quantity of the first resource type allocated to it and may be capable of using one or more alternate resource types as a substitute for the first quantity of the first resource type. The first quantity of the first resource type may then be reallocated from the trade-off group. In some embodiments, this reallocation may be made from the trade-off group to a first application running in the virtual computing environment. Further, in some embodiments, this reallocation may be made from the trade-off group to one or more host systems, whereby a total quantity of the first resource type allocated to applications running in the virtual computing environment may be reduced.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of some embodiments and do not limit the disclosure.

FIG. 1 illustrates a diagram of a resource substitution matrix, which includes several potential resource substitutions that may be utilized in order to free up scarce resource types in a virtual computing environment, consistent with embodiments of the present disclosure.

Figure 2:
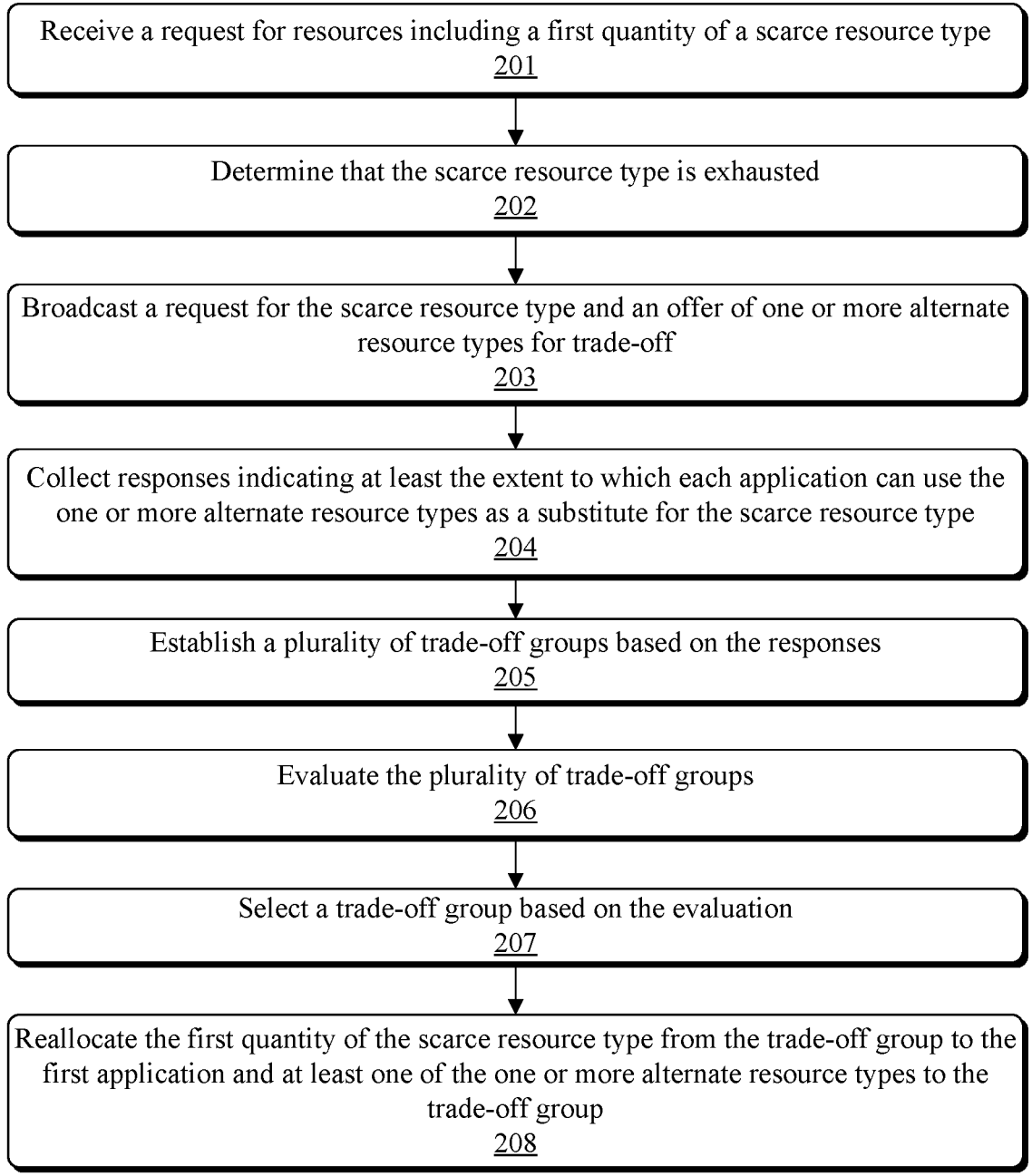
FIG. 2 illustrates a flowchart of a method for managing resource reallocation among applications in a virtual computing environment, consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to managing resource reallocation through resource substitution in applications running in virtual computing environments. While the present disclosure is not necessarily limited to such applications, various aspects of the disclosure may be appreciated through a discussion of various examples using this context.

The use of virtual computing environments may promote the sharing of resources. This may occur at least in part because in these environments many clients may share a large server or set of servers, rather than each client operating on its own server. This sharing of resources may, in turn, allow for more efficient resource allocation. In order to allocate resources optimally, however, several competing factors may need to be considered. For example, in determining the total quantity of each resource type that is made available to applications running in a given virtual computing environment, a balance may need to be struck between a desire to avoid waste by minimizing the quantity of free resources within the virtual computing environment (i.e., to maximize the percentage of each resource type that is currently allocated to applications) and a competing desire to ensure that there is not overutilization of resources (i.e., to avoid running out of one or more resource types and thereby causing a failure in one or more applications), even in situations where resource usage by applications may spike or otherwise be irregularly high. In some situations, these competing goals may create conflict. For example, in situations where close to all of the available resources of the virtual computing environment are allocated at a given time, risks of overutilization may arise when more resources are requested, either as new virtual machines (or applications) are initialized or as part of an increase in the usage of resources by existing virtual machines or applications.

In some situations, not all resource types are likely to be at risk of overutilization at the same time. That is to say, in some situations where there is a resource shortage, it may be for only one resource type and there may still be an abundance, or at least enough, of other resource types on hand. This fact may be leveraged. Specifically, those resource types for which there is not a shortage may be used as a substitutes for those resource types for which there is a shortage.

There may be many options for resource substitution within a virtual computing environment. Turning now to FIG. 1, shown is a resource substitution matrix 100, which includes several of these potential resource substitutions. By using the resource substitutions shown in this matrix, it may be possible to effectively free up certain scarce resource types from applications so that these resources can be reallocated to elsewhere within a virtual computing environment. As used herein, a scarce resource type may refer to any resource type that a virtual machine (or application) has requested for which there may not be enough of that resource type freely available within the relevant virtual computing environment to fulfill the request or at least not enough freely available to fulfill the request without reducing the free quantity of that resource type to an unacceptable level. In the illustrated embodiment, a chart shows five resource types that may be available for trade-off to relieve the impact of a situation wherein one of the other of those five resource types is scarce. These resource types include central processing unit (CPU), for example as measured in gigahertz (GHz); memory, for example as measured in kilobytes (KB); network (i.e., network bandwidth), for example as measured in megabytes per second (MB/Sec); storage, for example as measured in gigabytes (GB); and graphics processing unit (GPU), for example as measured in gigahertz (GHz). In practice, resource substitutions may occur at the individual virtual machine or application level and may be hardcoded into an application or coded in a more flexible manner so as to allow the application to respond appropriately to the conditions of the virtual computing environment.

In some embodiments, these resource substitutions may allow an application to use less of a scarce resource type by using more of other available resource types and/or changing the manner in which it uses these available resource types. For example, as depicted in substitution matrix 100, an application may be able to compensate for a reduction in CPU (i.e., a reallocation of some quantity of CPU from that application to another application) by reducing compression of stored to data, thereby increasing its use of storage. Furthermore, in some embodiments, a quantity of a scarce resource type may be obtained from multiple applications that each make a different resource substitution or set of resource substitutions. For example, if a given amount of storage needs to be freed up, then one application could free up half of that amount by using more CPU to increase the compression of stored data, and a second application could free up another half of that amount of storage by increasing its cache size (i.e., using more memory). It is also noted that some trade-offs may not actually require any additional resources in order to make the substitutions discussed herein. For example, an application may be able to free up a quantity of a scarce resource type simply by using the quantities of other resource types allocated to it more efficiently or in a different manner. In some embodiments where quantities of scarce resources are freed up in this manner, the users of the applications that free up the scarce resources may receive discounts on their monetary costs, for example, in the form a reduced monthly hosting charge. This cost reduction may be proportional to the quantity of scarce resources that are returned.

While a limited number of trade-offs and only five resource types are discussed in reference to substitution matrix 100, it is contemplated that, in some embodiments, more trade-offs may be possible and other resource types could be considered and used for trade-offs. Moreover, techniques for performing certain trade-offs could be hereafter discovered and implemented in the same manner.

Turning now to FIG. 2, shown is a flowchart of a method 200 for managing resource reallocation among applications in a virtual computing environment. The method begins at block 201 with a host system within the virtual computing environment receiving a request for resources from a monitoring client on a virtual machine running in the virtual computing environment. In some embodiments, the virtual machine may be newly established and may be requesting an initial allocation of resources. In other embodiments, the virtual machine making the request may have been previously established and may be requesting additional resources beyond its initial allocation, either because the applications running on the virtual machine have increased their need for a certain resource type or because there has been an increase in the number of applications running on the virtual machine. Included in the request of block 201, is a request for a first quantity of a first, scarce resource type. Such a request may include, for example, a request for 500 KB of RAM where the scarce resource type is memory.

The host system may then attempt to allocate the requested resources to the requesting virtual machine. However, per block 202, the host system may determine that it cannot fulfill the request because one or more resource types, including the scarce resource type, is exhausted. In some embodiments, a resource type may be deemed exhausted when the quantity of that resource type that is free within the virtual computing environment (i.e., not allocated to a particular virtual machine or application) is below a threshold quantity. In some embodiments, this threshold quantity may be zero or, more precisely, less than the amount requested by the requesting virtual machine. Further, in some embodiments, this threshold quantity may be the amount that has been allocated as reserves for that particular resource type. Such reserves may be held for a number of contingencies, for example, for an unpredicted spike in resource need.

Next, based on the need for the scarce resource type, the host system may, per block 203, make a broadcast to all of the virtual machines that are running within the virtual computing environment. The broadcast may include both a request for the scarce resource type and an offer of one or more alternate resource types for trade-off. The alternate resource types for trade-off may include those resource types of which there is determined to be more than a threshold quantity. For example, if there are 500 MB/Sec of free network bandwidth with a reserve threshold of 300 MB/Sec of free network bandwidth, then the broadcast may indicate that there is 200 MB/Sec of network bandwidth available for trade-off. In some embodiments, more than one resource type may be indicated as available for trade-off at the same time.

Next, per block 204, the host system may collect responses from the monitoring clients on all of the virtual machines running in the virtual computing environment. These responses may indicate the extent to which each application can use the one or more alternate resource types as a substitute for the scarce resource. For instance, if the first resource is CPU, then one virtual machine may indicate that it is running an application that could give up a quantity of CPU (e.g, where at least that quantity of CPU is currently allocated to it) in exchange for another quantity of memory (which may be done, as shown in the substitution matrix 100 of FIG. 1, by using the increased memory to increase the cache size for instructions or data, so as to decrease the application's need for CPU).

Per block 205, based on these responses from the virtual machines, the host system may establish a plurality of trade-off groups. As used herein, a trade-off group may refer to a set of one or more applications running in the virtual computing environment that can together use quantities of one or more alternate resource types as a substitute for the desired quantity of a first (e.g., scarce) resource type. An example trade-off group might be a single application that can relinquish the desired quantity of the scarce resource type in exchange for a substituted quantity of a single alternate resource type. Another example trade-off group might be two applications that can each relinquish half of the desired quantity of the scarce resource type in exchange for a first substituted quantity of a first alternate resource type (to the first application) and a second substituted quantity of a second alternate resource type (to the second application). By establishing a plurality of trade-off groups, the host system may allow itself a number of options to choose from for a particular resource reallocation.

Next, per block 206, the host system may evaluate the plurality of trade-off groups. This evaluation may be done in a number of different ways. Two potential methods for evaluating trade-off groups are discussed in more detail below in reference to FIGS. 5 and 6. Based on the evaluation, a trade-off group may be selected, per block 207. Next, per block 208, the desired quantity of the scarce resource type may be reallocated from the applications of the selected trade-off group to the requesting application and, in return, at least one of the one or more alternate resource types may be allocated to the applications of the trade-off group and used by these applications a substitutes for the first resource type.

Some embodiments may function differently than as described in example method 200. For example, it is contemplated that in some embodiments, the alternate resource types that may be used in a resource substitution by the application giving up the scarce resource type may include resources that are already allocated to that application (i.e., the application may be able to free up a quantity of the scarce resource type simply by modifying the manner in which it utilizes the other resources (of one or more resource types) that it has already been allocated). Furthermore, in some embodiments, the resource type that is substituted for may not be a scarce resource type, as the term is used herein (i.e., other reasons besides scarcity may motivate resource substitution).

Furthermore, in some embodiments, the method 200 may not be initiated based on an application's need for more of a scarce resource type, but rather may be initiated in order to reduce the total amount of the scarce resource type that is allocated to applications running in the virtual computing environment. In such cases, the applications may be asked to perform the trade-off, not for another application, but rather for the system as a whole. This may occur, for instance, where the host system determines that too much of the scarce resource type has been allocated to applications. It may also occur where a portion of the allocated scarce resource type needs to be recalled because the total available quantity of the scarce resource may need to be reduced temporarily or permanently; for example, the host system may need to reduce the total amount of storage that is allocated to applications in the virtual computing environment because one of the servers utilized by the virtual computing environment needs to be shut down for maintenance.

Furthermore, in some embodiments, certain parameters may need to be maintained at acceptable levels (i.e., at or above thresholds) in order for a trade-off group to be selected. This may help to insure that the applications of the selected trade-off group are not unduly burdened by a resource substitution. Examples of parameters that may need to be maintained include performance or energy usage (i.e., where a higher parameter value is associated with a lower energy usage). For example, prior to a resource reallocation, a potential trade-off group may be associated with some acceptable level of performance (as measured for each individual application or as an average whole). In such an example, in order for the potential trade-off group to be selected, the trade-off group must be able to decrease its usage of the scarce resource type and increase its usage of at least one of the one or more alternate resources, while still maintaining an acceptable performance level (i.e., continuing to be above a threshold performance level).

Figure 3:
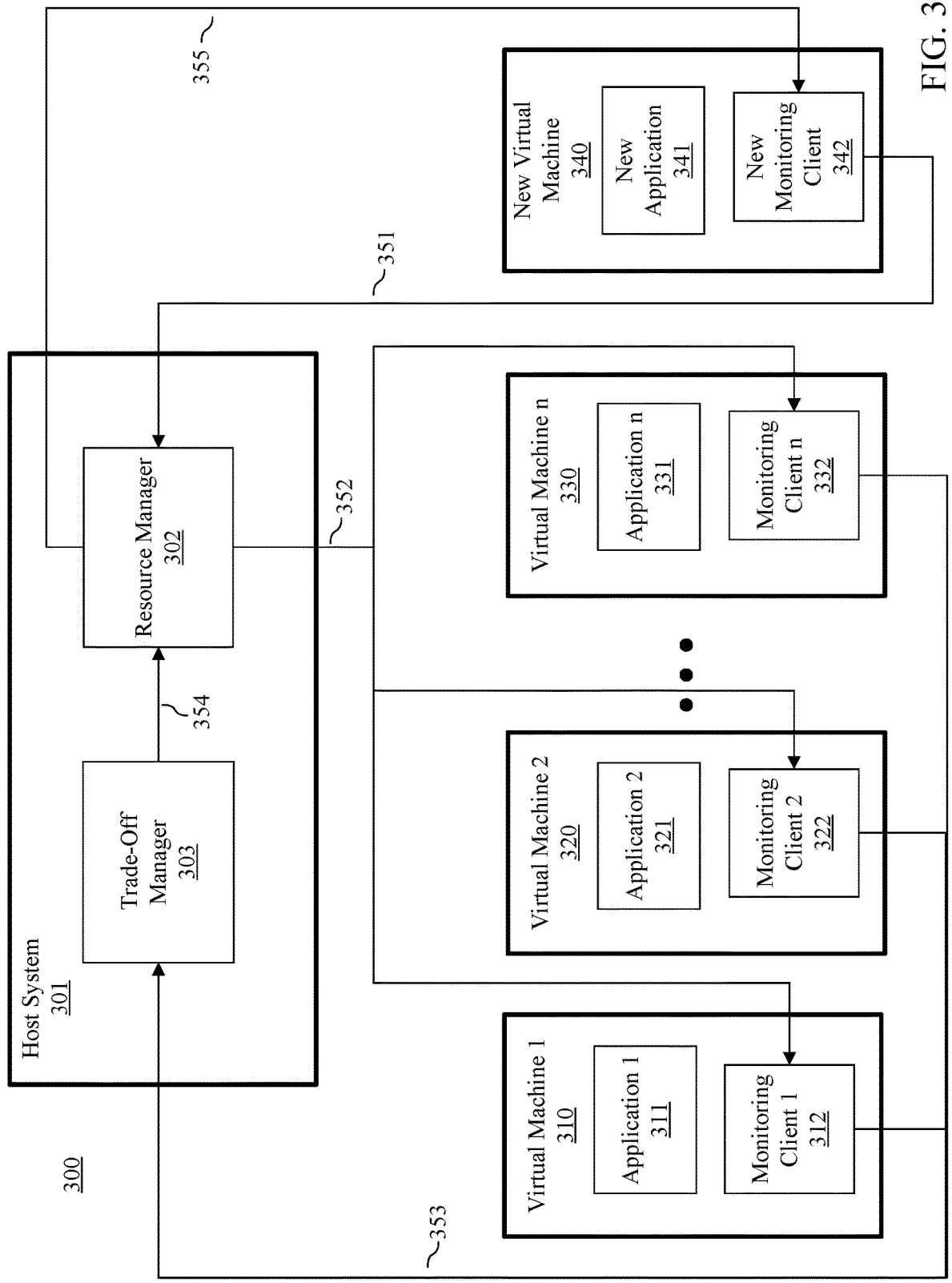
FIG. 3 illustrates a block diagram of an example high level logical architecture of a virtual computing environment including a host system and multiple virtual machines, consistent with embodiments the present disclosure.

Turning now to FIG. 3, shown is a block diagram of virtual computing environment 300 that may be configured to perform one or more of the methods described herein. The virtual computing environment 300 may include a host system 301 and multiple virtual machines 310, 320, 330, and 340. Within host system 301, a trade-off manager 303 and resource manager 302 may be included. The resource manager 302 may serve to allocate resources among the virtual machines of the virtual computing environment and receive requests for new or modified allocations (e.g., reallocations). The trade-off manager 303 may be responsible for collecting responses to reallocation requests, establishing trade-off groups based on the responses, and evaluating these trade-off groups.

In the virtual computing environment 300, any number of existing virtual machines may be included as is represented by virtual machines 1, 2, and n (referenced by numerals 310, 320, and 330, respectively). In addition, one or more newly initialized virtual machines 340 may also be included in the virtual computing environment 300. Within each virtual machine, may be a monitoring client 312, 322, 332, 342 and an application 311, 321, 331, 341. Although it is contemplated that each virtual machine may include more than one application, single applications are depicted here for the purpose of clarity.

During initialization of the new virtual machine 340, it may be determined that certain quantities of certain resource types may need to be allocated to the new application 341. The new monitoring client 342 may send a request 351 for such an allocation to the resource manager 302. Upon reviewing the request, the resource manager 302 may determine that one of the requested resource types is unavailable and may broadcast its own request 352 to the other virtual machines 312, 322, and 332. This request 352 may include a request for the unavailable resource type and an offer of one or more alternate resource types. Each monitoring client 312, 322, 332 may receive the request 352 from the resource manager 302 and, by reviewing the current resource usage and resource requirements of the application running on its respective virtual machine, may send a response 353 back to the host system 301 indicating the quantity of the scarce resource type that it can give up and the quantities of at least one of the one or more alternate resources that it would require in return. Some virtual machines may indicate they cannot provide any of the scarce resource type (e.g., because they need all of the resources that they have been allocated). Based on collecting and analyzing the responses, the trade-off manager 303 may establish and evaluate a plurality of trade-off groups. A desired trade-off group may then be select and a direction 354 may be sent to the resource manager 302 indicating the manner in which resources should be reallocated. The resource manager 302 may then reallocate the resources among the virtual machines and, per 355, allocate the requested resource type to the new virtual machine 340.

In some embodiments, further communication between the host system 301 and the monitoring clients 312, 322, and 332 may aid in identifying and carrying out these resource substitutions. For example, in a situation where virtual machine 310 has agreed to give up a certain quantity of a scarce resource type, communication between a host system 301 and monitoring client 312 may confirm and finalize the amounts and timing of the resources to be traded. Clarifying the timing of a resource trade may also be helpful in other situations; for example, a virtual machine may specify a certain point in time where a scarce resource type can be partially freed up for a trade-off. To facilitate this timing aspect of the trade-off, a timing factor may be present in certain trade-off agreements (e.g., a monitoring client may agree to free up a quantity of the scarce resource type in six minutes).

Figure 4:
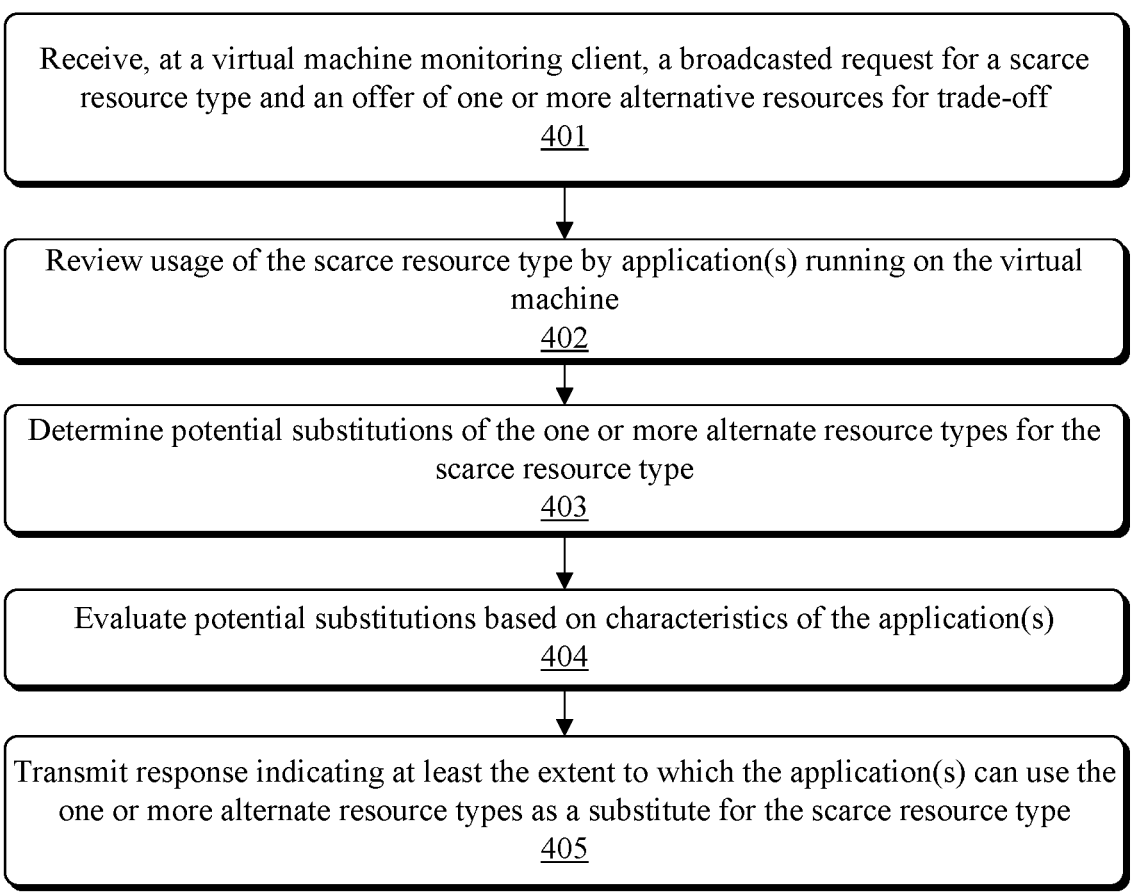
FIG. 4 illustrates a flowchart of a method for determining resource substitutions that may be acceptable for a given application, consistent with embodiments of the present disclosure.

Turning now to FIG. 4, shown is a flowchart of a method 400 for determining potential resource substitutions for a given application. The method may begin at block 401 where a monitoring client of a virtual machine receives a broadcasted request for a scarce resource type and an offer of one or more alternate resources types for trade-off. In some embodiments, this broadcast may be the broadcast that is transmitted by the host system in block 203 of FIG. 2. In response to receiving the broadcast, the monitoring client may review, per block 402, the usage of the scarce resource type by the one or more applications running on the virtual machine. Next, per block 403, the monitoring client may determine potential substitutions of combinations of the one or more alternate resource types that it can make (e.g., using substitution matrix 100 of FIG. 1) to allow it to relinquish some of the scarce resource type. For example, if the scarce resource type is storage, then the monitoring client might determine that an application running on the virtual machine can either free up 2 GB of storage by modifying the manner in which it is using its current allocation of memory or free up 3 GB of storage by obtaining an extra 20 MB/Sec of the host system's free network bandwidth. Next, these potential substitutions may be evaluated, per block 404. When evaluating potential substitutions, the monitoring client may consider characteristics of the application which would undergo the substitution. Some characteristics that may be taken into account may be the effects that the substitution will have on the performance of the application. For example, relinquishing a quantity of GPU might not be a problem for a word processing application, but might be an issue for a gaming application (where the quality of the graphics may have a greater impact on the user's experience). Per 405, based on these evaluations, the virtual machine may transmit a response back to the host device indicating the extent to which the one or more applications on the virtual machine can use one or more of the alternate resource types as a substitute for the scarce resource type. This response may also include other information, such as the desirability of making the reallocation and the precise quantity of each alternate resource type that would need to be reallocated to the virtual machine in order to make the substitution feasible. In some embodiments, this response, taken together with responses from other virtual machines in the monitored environment, may be collected by a host system per block 204 of FIG. 2.

While method 400 may be done without user interaction, in some embodiments, user input may be used in determining whether a potential resource substitution will be acceptable. For example, in some embodiments, feedback from a user of a virtual machine may be used to determine whether a potential substitution may be made. This may be done in situations where the users may want more control over their experiences. Such an ability to control whether a potential resource substitution is acceptable may be significant to a user in a case where a potential resource substitution may be technically feasible but is still not acceptable to the user based on the user's preferences or characteristics of the application. In addition, it is further contemplated, that some or all of the functions ascribed to the monitoring client in the example method 400 may, in some embodiments, be performed by other components of the virtual machine or may be performed by other aspects of the host system. In situations where the host system makes more of the decisions about potential resource substitutions, the responses transmitted to the host system from the virtual machine may include more raw data rather than analysis. For example, in some embodiments, the monitoring client may only provide to the host system with a list of the types of applications that are running on the machine and the resource usage (by type and quantity) by each application. The host system may in turn use this information to make detailed evaluations about potential resource substitutions.

Figure 5:
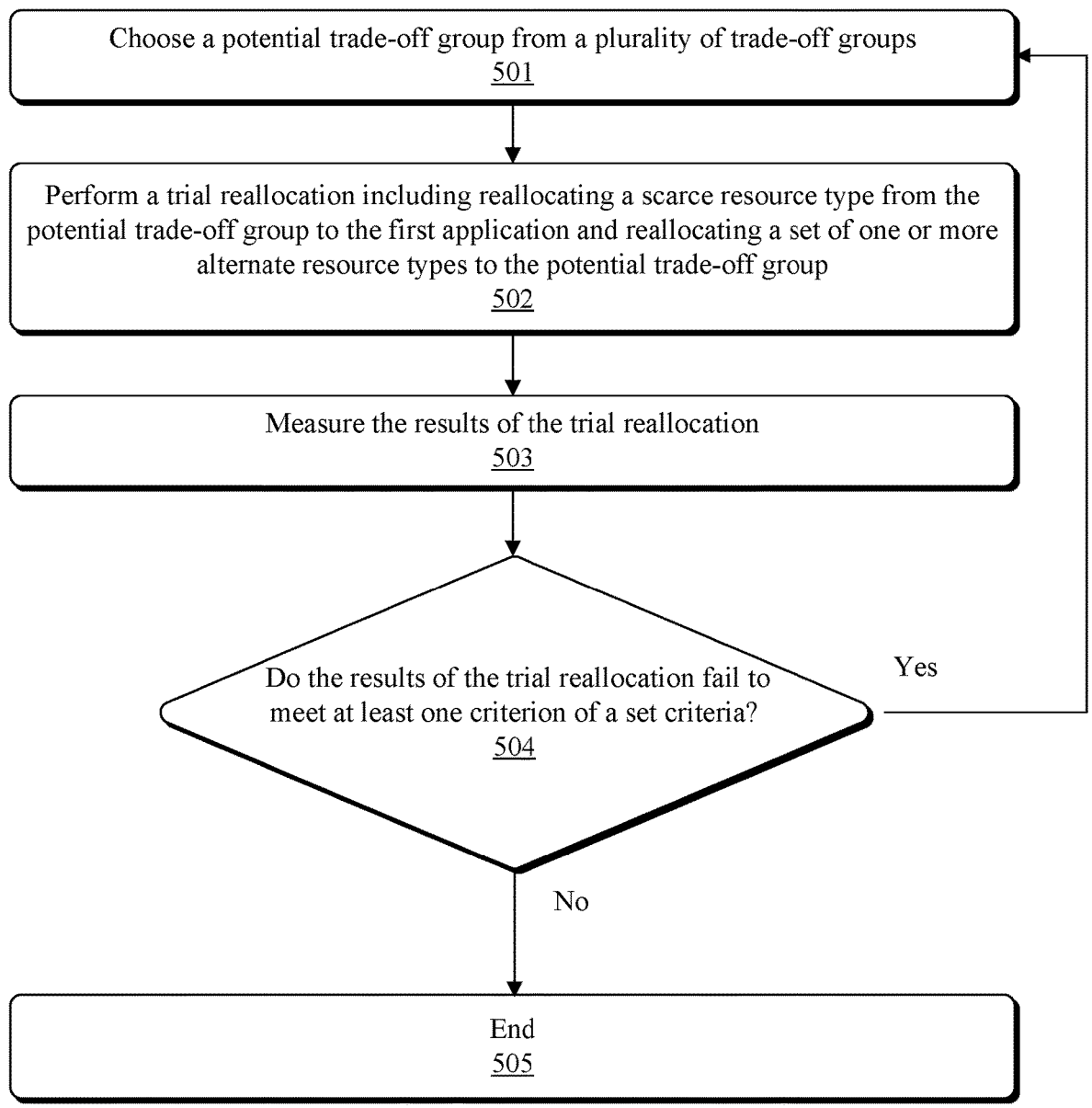
FIG. 5 illustrates a flowchart of a trial allocation method for evaluating potential trade-off groups, consistent with embodiments of the present disclosure.

Turning now to FIG. 5, shown is a flowchart of trial allocation method 500 for evaluating trade-off groups. In some embodiments, this method may be used as part of the step of evaluating the plurality of trade-off groups discussed in reference to block 206 of FIG. 2. The method may begin at block 501 with a potential trade-off group being chosen by the host system from among the plurality of trade-off groups. The potential trade-off group may be chosen at random or based on some other method or algorithm. Per block 502, a trial reallocation is performed. As part of the trial reallocation, the desired quantity of the scarce resource type is reallocated from the applications of the trade-off group to the requesting application and the set of one or more alternate resource types to be exchanged are allocated to the potential trade-off group. Per 503, the result of the trial reallocation are measured. This measuring may involve the review of one or more metrics, such as performance, energy usage, cost, etc.

Next the measured results of the trial reallocation may be compared with a set of criteria. As used herein, criteria may refer to one or more requirements that must be satisfied. These criteria may relate to all of the applications collectively, all of the applications individually, or only to certain applications affected by the trial reallocation. Example criteria may include a requirement that energy usage by the applications of the potential trade-off group not increase by more than 15% as a result of the trade-off. In some embodiments, the criteria may take the form a sliding scale, wherein a less favorable impact on one metric might be acceptable if there is a more favorable impact on a second metric. Per 504, if one or more criterion are failed, then another potential trade-off group may be chosen and steps 501-503 may be repeated. If, however, all of the criterion are met, then the successful trial allocation may be left in place and the method may end, per block 505. In some situations, it may take multiple trials in order to obtain a successful allocation.

Figure 6:
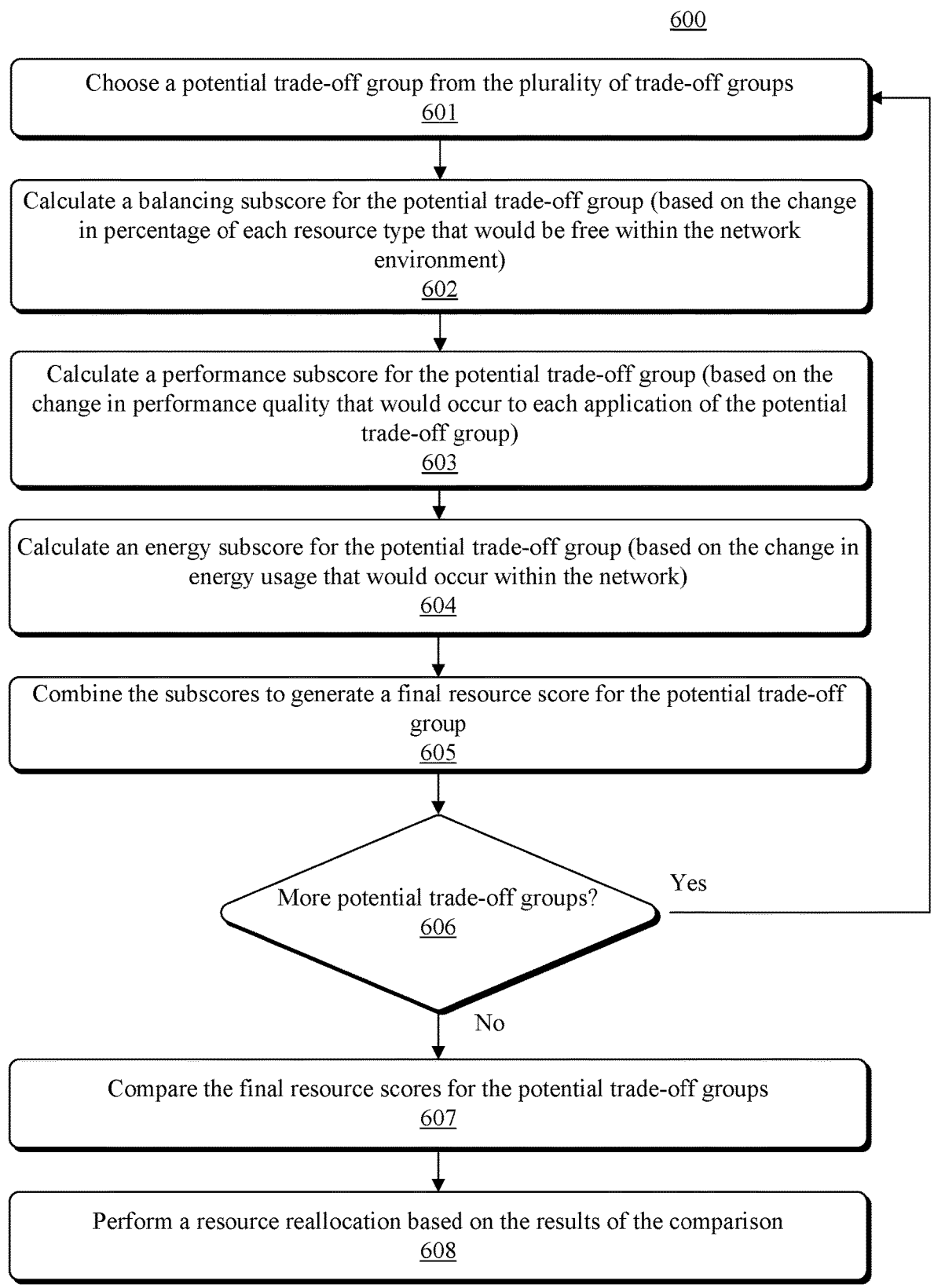
FIG. 6 illustrates a flowchart of a score comparison method for evaluating potential trade-off groups, consistent with embodiments of the present disclosure.

Turning now to FIG. 6, shown is a score comparison method 600 for evaluating trade-off groups. Like method 500, in some embodiments, method 600 may be used as part of the evaluating in block 206 of FIG. 2. The method may begin with a potential trade-off group being chosen from among the plurality of trade-off groups, per block 601, by a host system. Next, per block 602, a balancing subscore may be calculated for the potential trade-off group. This balancing subscore may take into account the percentage of each resource type that would be free within the virtual computing environment if the potential trade-off group were to be selected. In some embodiments, a more favorable balancing subscore may indicate a greater degree of parity among the resource types (e.g., where each resource type has roughly the same percentage free within the virtual computing environment).

Next, per block 603, a performance subscore may also be calculated for the potential trade-off group. This performance subscore may be indicative of the change in performance quality that would occur to each application of the potential trade-off group if this particular trade-off group were to be selected. In some embodiments, there may be several possible different metrics that could be used to quantify a change in performance quality. For example, the host system could compare the current usage of each resource type by each application with the amount of each resource type that would be available to each application after the reallocation occurs. Applications that would have access to lesser quantities of resources after the reallocation would tend to negatively impact the performance subscore, particularly where the reduced resource type is significant to the performance of that particular application (e.g., a reduction in GPU might be particularly significant to a gaming application).

Next, per block 604, an energy subscore may also be calculated for the potential trade-off group. This energy subscore may be based on the change in energy usage that would occur within the virtual computing environment if the potential trade-off group were selected. A lower energy usage may be associated with a more favorable energy subscore. Because different types of resource substitutions may result in different changes in energy consumption by the applications of the trade-off groups, energy subscores may vary between potential trade-off groups. For example, while additional network bandwidth and additional memory may both be adequate substitutes for reduced CPU, the addition of network bandwidth may be the more energy efficient alternative.

Per block 605, the subscores may be combined to generate a final resource subscore for the potential trade-off group. In some embodiments, not all subscores may be weighted equally in their impact on the final resource score. In addition, while three subscores may be used in this example, it is contemplated that as few as one subscore or as many as a large number of subscores of varying types may be used in some embodiments. Per block 606, a determination may be made as to whether there are any more potential trade-off groups for which a final resource score has not be calculated. If so, then the next potential trade-off group may be chosen and blocks 602-605 may be repeated for that potential trade-off group. Once a final resource score has been calculated for all of the relevant potential trade-off groups, the scores may, per block 607, be compared. Based on the results of the comparison, per block 608, the potential trade-off group with the most favorable final resource score may be selected and the resource reallocation indicated for that trade-off group may be performed.

In some embodiments, the optimization goals represented by the three types of subscores described herein may not be the only factors considered in selecting trade-off groups. Other factors or goals as represented by any other type of subscore may also be considered, for example, in the performance of some embodiments of the method 600.

As discussed in more detail below, it is contemplated that some or all of the steps of some of the embodiments of methods described herein may be performed in alternative orders or may not be performed at all; furthermore, multiple steps may occur at the same time or as an internal part of a larger process. For example, per blocks 602-605 of method 600 of FIG. 6, a balancing subscore, a performance subscore, and an energy subscore, may, in some embodiments, all be calculated as part of the generation of a final resource score, rather than as separate steps having their own distinct outputs.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
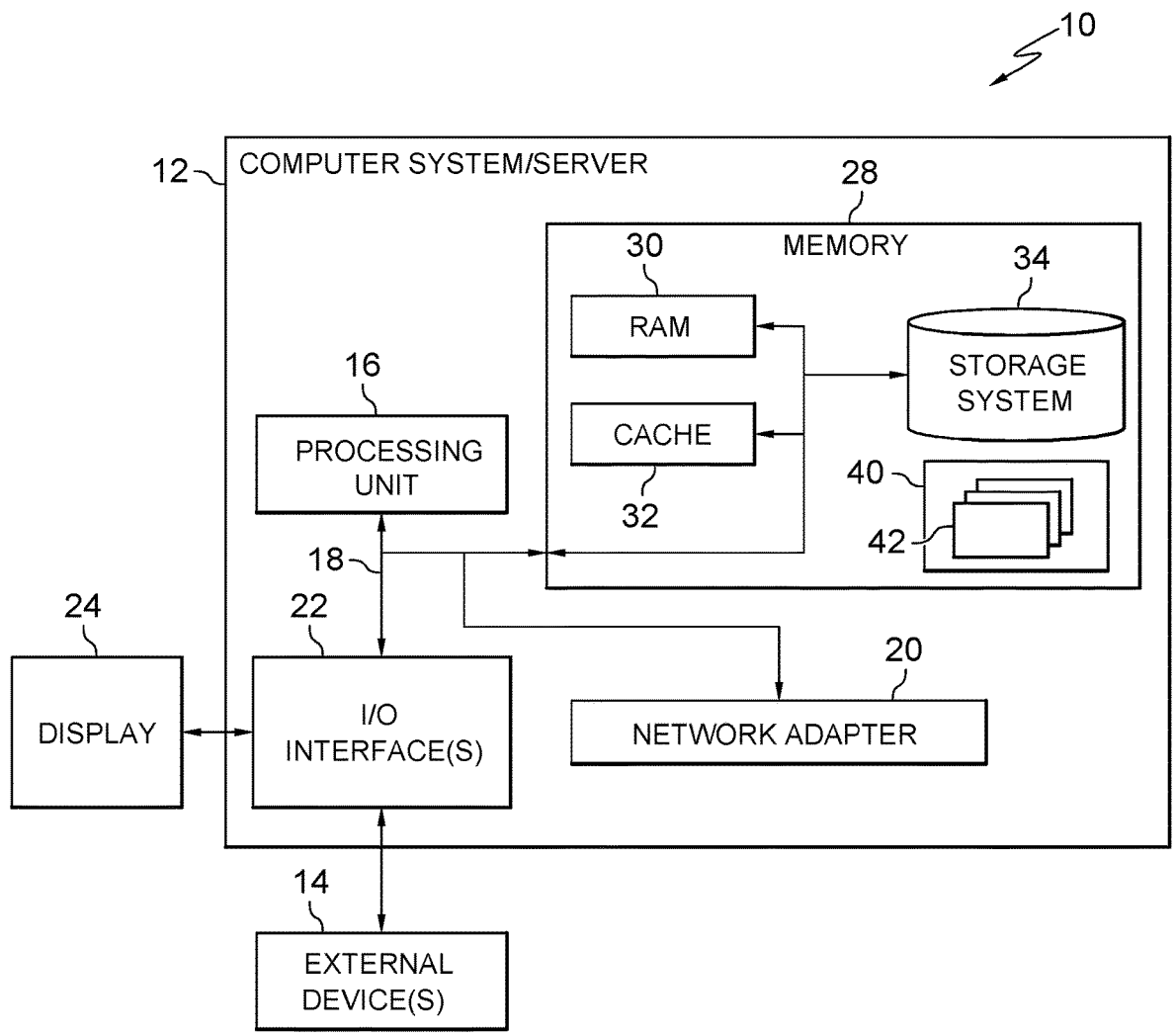
FIG. 7 illustrates a diagram of a cloud computing node, consistent with embodiments of the present disclosure.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. In some embodiments, it is contemplated that computer system/server 12 may be incorporated in one or more of the virtual machines or host systems described in reference to the present disclosure.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 8:
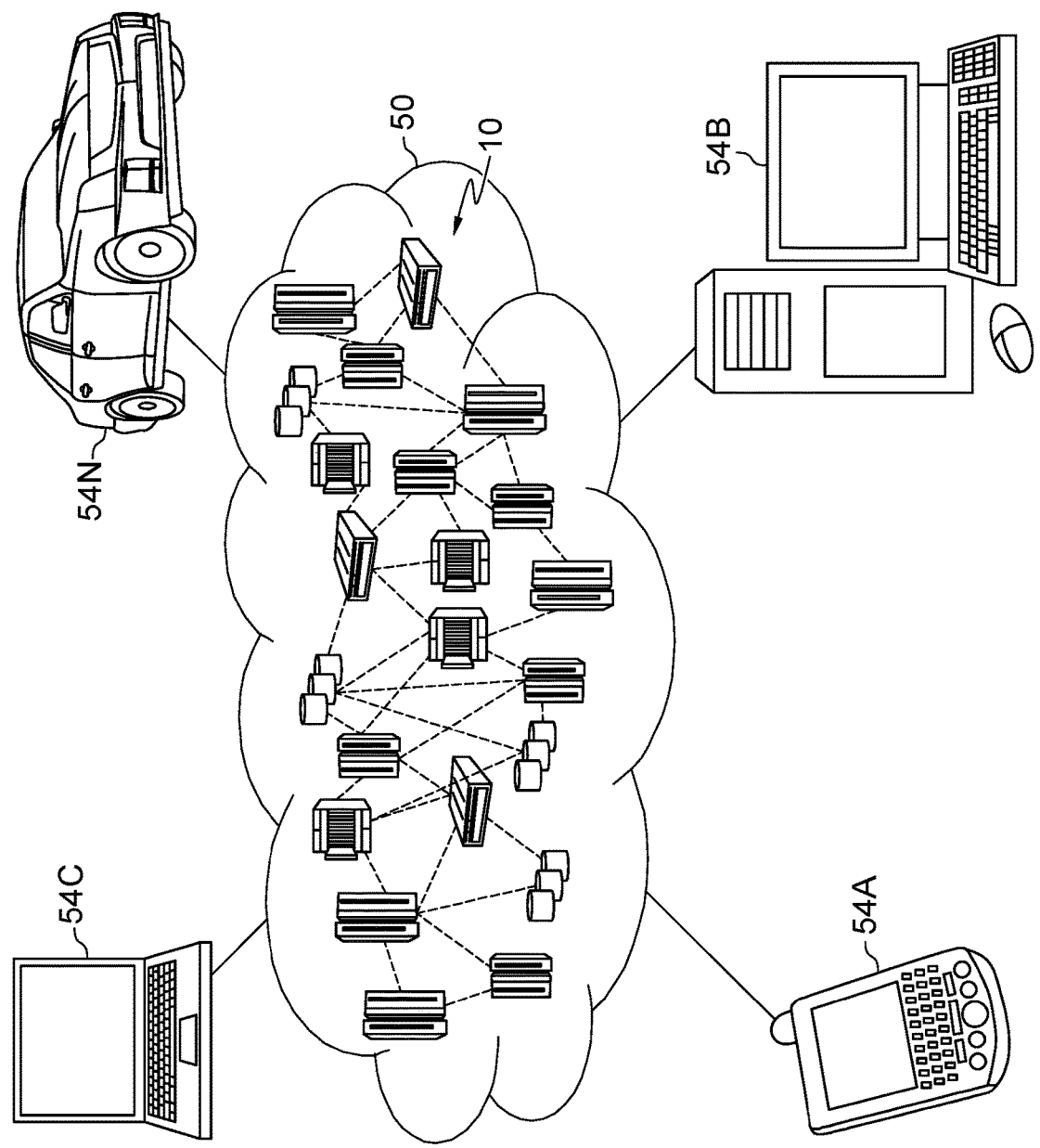
FIG. 8 illustrates a diagram of a cloud computing environment, consistent with embodiments of the present disclosure.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
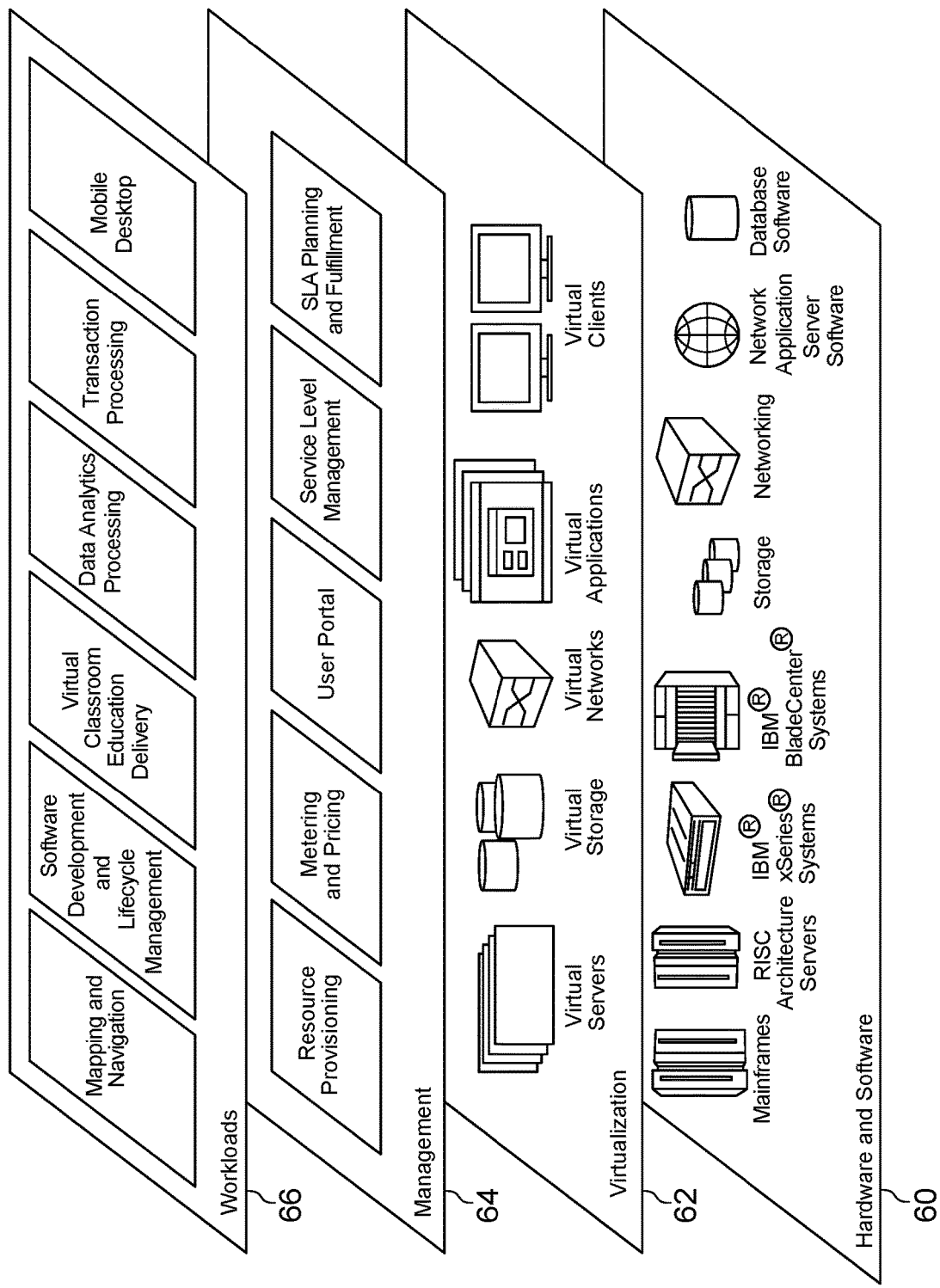
FIG. 9 illustrates a diagram of abstraction model layers, consistent with embodiments of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients. Various aspects of the present disclosure are directed toward monitoring the status of deployment components within the virtualization layer 62 using deployment patterns, as discussed in more detail herein.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. In some embodiments, such resource allocation and management may take the form of one or more of the methods described herein (e.g., methods for managing resource substitution and reallocation within virtual computing environments). Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing; and mobile desktop.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for managing resources of a plurality of resource types in a virtual computing environment having a plurality of applications running therein, the system comprising:
  a memory; and
  a processor in communication with the memory, the processor configured to obtain instructions from the memory that cause the processor to perform a method comprising:
  determining that there is a scarcity of a first resource type of the plurality of resource types;
  broadcasting, based on the determination, a request for the first resource type and an offer of one or more alternate resource types of the plurality of resources types for substitution, wherein the first resource type is a different resource type from each of the one or more alternate resource types;
reviewing, in response to the request, usage of the first resource type by at least one application of the plurality of applications running on a virtual machine;
evaluating, based on the reviewed usage of the first resource type and characteristics of the at least one application, an extent to which the at least one application can substitute the one or more alternate resource types for the first resource type;
collecting a plurality of responses to the broadcasted request, wherein each response indicates an extent to which at least one corresponding application of the plurality of applications can substitute the one or more alternate resource types for the first resource type;
selecting, based on the collected responses, a trade-off group, the trade-off group including a set of applications of the plurality of applications; and
reallocating, based on the selection, a first quantity of the first resource type from the trade-off group and a second quantity of at least one of the one or more alternate resource types to the trade-off group that results in a substitution of the at least one of the one or more alternate resource types for the first resource type by the set of applications.

2. The system of claim 1, wherein the method further comprises:
receiving, at the virtual machine, the broadcasted request; and
providing, based on the evaluation, one of the collected responses.

3. The system of claim 1, wherein the first resource type and each of the one or more alternate resource types are selected from the group of resource types consisting of central processing unit, computer memory, network, storage, and graphics processing unit.

4. The system of claim 1, wherein, prior to the reallocation, the set of applications are using a total quantity of the first resource type in excess of the first quantity such that subsequent to the reallocation the set of applications still have a remaining quantity of the first resource type to use.

5. A system for managing resources of a plurality of resource types in a virtual computing environment having a plurality of applications running therein, the system comprising:
a memory; and
a processor in communication with the memory, the processor configured to obtain instructions from the memory that cause the processor to perform a method comprising:
determining that there is a scarcity of a first resource type of the plurality of resource types;
broadcasting, based on the determination, a request for the first resource type and an offer of one or more alternate resource types of the plurality of resources types for substitution, wherein the first resource type is a different resource type from each of the one or more alternate resource types;
collecting a plurality of responses to the broadcasted request, wherein each response indicates an extent to which at least one corresponding application of the plurality of applications can substitute the one or more alternate resource types for the first resource type;
selecting, based on the collected responses, a trade-off group, the trade-off group including a set of applications of the plurality of applications; and
trading, based on the selection, a first quantity of the first resource type from the trade-off group in exchange for a second quantity of at least one of the one or more alternate resource types to the trade-off group such that the set of applications thereby substitute the second quantity of the at least one of the one or more alternate resource types for the first quantity of the first resource type.

6. The system of claim 5, wherein the method further comprises:
reviewing, in response to the request, usage of the first resource type by at least one application of the plurality of applications running on a virtual machine; and
evaluating, based on the reviewed usage of the first resource type and characteristics of the at least one application, an extent to which the at least one application can substitute the one or more alternate resource types for the first resource type.

7. The system of claim 6, wherein the method further comprises:
receiving, at the virtual machine, the broadcasted request; and
providing, based on the evaluation, one of the collected responses.

8. The system of claim 5, wherein the first resource type and each of the one or more alternate resource types are selected from the group of resource types consisting of central processing unit, computer memory, network, storage, and graphics processing unit.

9. The system of claim 5, wherein, prior to the reallocation, the set of applications are using a total quantity of the first resource type in excess of the first quantity such that subsequent to the reallocation the set of applications still have a remaining quantity of the first resource type to use.

10. A system for managing resources of a plurality of resource types in a virtual computing environment having a plurality of virtual machines, the system comprising:
a memory; and
a processor in communication with the memory, the processor configured to obtain instructions from the memory that cause the processor to perform a method comprising:
receiving a request to reallocate a first quantity of a first resource type of the plurality of resource types to a first virtual machine of the plurality of virtual machines;
identifying a trade-off group, the trade-off group including a set of virtual machines of the plurality virtual machines, the trade-off group having at least the first quantity of the first resource type allocated to it;
calculating, based on usage of the first resource type and characteristics of the set of virtual machines, a second quantity of one or more alternate resource types that can be used as direct substitutes for the first quantity of the first resource type by modifying the manner in which the set of virtual machines use both the first resource type and the one or more alternate resource types, wherein the first resource type is a different resource type from each of the one or more alternate resource types; and
reallocating the first quantity of the first resource type from the trade-off group to the first virtual machine and the second quantity of the one or more alternate resource types to the trade-off group that results in a substitution of at least one of the one or more alternate resource types for the first resource type by the set of virtual machines.

11. The system of claim 10, wherein the first resource type and each of the one or more alternate resource types are selected from the group of resource types consisting of central processing unit, computer memory, network, storage, and graphics processing unit.

12. The system of claim 10, wherein, prior to the reallocation, the set of virtual machines are using a total quantity of the first resource type in excess of the first quantity such that subsequent to the reallocation the set of virtual machines still have a remaining quantity of the first resource type to use.

* * * * *